United States Patent
Hamagishi et al.

(10) Patent No.: US 10,244,229 B2
(45) Date of Patent: Mar. 26, 2019

(54) THREE-DIMENSIONAL IMAGE DISPLAY DEVICE

(71) Applicant: SAMSUNG DISPLAY CO., LTD., Yongin, Gyeonggi-Do (KR)

(72) Inventors: Goro Hamagishi, Hwaseong-si (KR); Kyung Ho Jung, Seongnam-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 665 days.

(21) Appl. No.: 14/664,304

(22) Filed: Mar. 20, 2015

(65) Prior Publication Data

US 2016/0065951 A1    Mar. 3, 2016

(30) Foreign Application Priority Data

Sep. 3, 2014    (KR) ........................ 10-2014-0117100

(51) Int. Cl.
| | |
|---|---|
| *H04N 13/305* | (2018.01) |
| *H04N 13/31* | (2018.01) |
| *H04N 13/317* | (2018.01) |
| *G02B 27/22* | (2018.01) |

(52) U.S. Cl.
CPC ....... *H04N 13/305* (2018.05); *G02B 27/2214* (2013.01); *H04N 13/31* (2018.05); *H04N 13/317* (2018.05)

(58) Field of Classification Search
CPC ........... H04N 13/0404; H04N 13/0409; H04N 13/305; H04N 13/317; H04N 13/31; G02B 27/2214
USPC ....................................................... 359/463
See application file for complete search history.

(56) References Cited

U.S. PATENT DOCUMENTS

| | | | | |
|---|---|---|---|---|
| 2011/0001803 A1* | 1/2011 | De Zwart | .......... | H04N 13/0415 348/51 |
| 2013/0128162 A1 | 5/2013 | Sakamoto et al. | | |

FOREIGN PATENT DOCUMENTS

| | | |
|---|---|---|
| JP | 10-186294 | 7/1998 |
| JP | 2001-166259 | 6/2001 |
| JP | 2009-098311 | 5/2009 |
| JP | 2011-164148 | 8/2011 |
| JP | 2011-197376 | 10/2011 |
| JP | 2011-197508 | 10/2011 |
| KR | 10-2012-0021074 | 3/2012 |

* cited by examiner

*Primary Examiner* — Evan Dzierzynski
*Assistant Examiner* — Mitchell Oestreich
(74) *Attorney, Agent, or Firm* — F. Chau & Associates, LLC

(57) ABSTRACT

A three-dimensional image display device includes a display panel that includes a plurality of pixels arranged in a matrix shape; and a viewpoint divider that includes a plurality of viewpoint dividing units that are inclined at a tilt angle. Letting a row-directional pitch and a column-directional pitch of the pixels be respectively denoted as Hp and Vp, where Hp>Vp, the tilt angle satisfies the following equation:

$$A = \tan^{-1} \frac{b * Hp}{(3b+c) * Vp},$$

where c is −1 or 1, and b is a natural number that is greater than 1.

13 Claims, 25 Drawing Sheets

FIG. 19A

| Glass (mm) | OCA (mm) | Pol (mm) | OVD (mm) | NA | Lens pitch (mm) |
|---|---|---|---|---|---|
| 0.2 | 0.1 | 0.185 | 411.5 | 0.107 | 0.0696 |
| 0.25 | 0.1 | 0.185 | 453.4 | 0.097 | 0.0696 |
| 0.3 | 0.1 | 0.185 | 495.4 | 0.089 | 0.0696 |
| 0.35 | 0.1 | 0.185 | 537.3 | 0.082 | 0.0696 |
| 0.4 | 0.1 | 0.185 | 579.2 | 0.076 | 0.0696 |

FIG. 19B

| Glass (mm) | OCA (mm) | Pol (mm) | OVD (mm) | NA | Lens pitch (mm) |
|---|---|---|---|---|---|
| 0.2 | 0.1 | 0.185 | 412.0 | 0.107 | 0.0696 |
| 0.25 | 0.1 | 0.185 | 454.0 | 0.097 | 0.0696 |
| 0.3 | 0.1 | 0.185 | 496.0 | 0.089 | 0.0696 |
| 0.35 | 0.1 | 0.185 | 538.0 | 0.082 | 0.0696 |
| 0.4 | 0.1 | 0.185 | 579.9 | 0.076 | 0.0696 |

FIG. 21

| Glass (mm) | OCA (mm) | Pol (mm) | OVD (mm) | NA | Lens pitch (mm) |
|---|---|---|---|---|---|
| 0.2 | 0.1 | 0.185 | 342.9 | 0.128 | 0.0836 |
| 0.25 | 0.1 | 0.185 | 377.9 | 0.117 | 0.0836 |
| 0.3 | 0.1 | 0.185 | 412.8 | 0.106 | 0.0836 |
| 0.35 | 0.1 | 0.185 | 447.7 | 0.099 | 0.0836 |
| 0.4 | 0.1 | 0.185 | 482.7 | 0.091 | 0.0836 |

THREE-DIMENSIONAL IMAGE DISPLAY DEVICE

CROSS-REFERENCE TO RELATED APPLICATION

This application claims priority under 35 USC § 119 from and the benefit of Korean Patent Application No. 10-2014-0117100 filed in the Korean Intellectual Property Office on Sep. 3, 2014, the contents of which are herein incorporated herein by reference in their entirety.

BACKGROUND (a) Technical Field

Embodiments of the present disclosure are directed to a three-dimensional image display device, and more particularly, to an autostereoscopic three-dimensional image display device.

(b) Discussion of the Related Art

Recently, as display device techniques have been developed, display devices capable of displaying a three-dimensional (3D) image and methods of displaying 3D images have been investigated.

In general, in a 3D image display technology, stereoscopic perception of an object at a near distance can be achieved using binocular parallax. That is, when a left eye and a right eye receives different 2D images, and the image received in the left eye (hereinafter referred to as a "left eye image") and the image received in the right eye (hereinafter referred to as a "right eye image") are transmitted to a brain, the left eye image and the right eye image are combined by the brain to be recognized as a 3D image having depth.

Some 3D image display devices capable of displaying a 3D image using binocular parallax require the use of glasses, such as shutter glasses, polarized glasses, etc. On the other hand, an autostereoscopic 3D image display device that does not require the use of glasses uses an optical system such as a lenticular lens, a parallax barrier, etc., disposed in the display device.

The most frequently used autostereoscopic display device in recent years uses a lenticular lens, which realizes a 3D image by dividing a 3D image into several viewpoints with the lenticular lens and displaying it.

SUMMARY

Embodiments of the present disclosure can provide an autostereoscopic three-dimensional image display device that can provide a portrait mode and a landscape mode using one viewpoint divider, suppress a moiré phenomenon, and synthetically improve image quality.

An exemplary embodiment of the present disclosure provides a three-dimensional image display device including: a display panel that includes a plurality of pixels arranged in a matrix shape; and a viewpoint divider that includes a plurality of viewpoint dividing units that are inclined at a tilt angle, where Hp and Vp respectively denote a row-directional pitch and a column-directional pitch of the pixels, Hp>Vp, and the tilt angle A satisfies the following equation:

$$A = \tan^{-1} \frac{b * Hp}{(3b+c) * Vp},$$

where c is −1 or 1, and b is a natural number that is greater than 1.

A row-directional width of each pixel which is observed at the viewpoint dividing units may be Hp/(3b+c), and a column-directional width of each pixel which may be observed at the viewpoint dividing units may be Vp/b.

Let Lh and Lv respectively denote a row-directional lens pitch and a column-directional lens pitch of the viewpoint dividing units, each pitch of the viewpoint dividing unit may be configured to satisfy the following equation:

$$Lh : Lv = \frac{Hp}{3b+c} : \frac{Vp}{b}.$$

Let El denote a calculated viewing distance of a landscape mode of the three-dimensional image display device, Ep denote a calculated viewing distance of a portrait mode of the three-dimensional image display device, and E denote a human average viewing distance, El may satisfy the following equation:

$$El = \frac{Lh * E * 2}{Lh + Lv},$$

Ep may satisfy the following equation:

$$Ep = \frac{Lv * E * 2}{Lh + Lv},$$

and E may be average of El and Ep.

Let d denote a distance between a viewer eye and the viewpoint divider, g denote a distance between the viewpoint divider and the display panel, and kl denote a distance on the display panel that corresponds to a pitch of the viewpoint dividing unit in a landscape mode, the following equations may be satisfied:

$$El : d = \frac{kl}{2} : g$$

and Lh:d=kl:(d+g).

Let d denote a distance between a viewer eye and the viewpoint divider, g denote a distance between the viewpoint divider and the display panel, and kp denote a distance on the display panel that corresponds to a pitch of the viewpoint dividing unit in a portrait mode, the following equations may be satisfied:

$$Ep : d = \frac{kp}{2} : g$$

and Lv:d=kp:(d+g).

Let n denote the number of pixels of proximity dots, kl may satisfy the following equation:

$$kl = \frac{2n * Hp}{3b+c},$$

and kp may satisfy the following equation:

$$kp = \frac{2n * Vp}{b}.$$

The viewpoint dividing unit may be a lenticular lens.

The viewpoint dividing unit may be a parallax barrier.

An exemplary embodiment of the present disclosure provides a viewpoint divider for a three-dimensional image display device that includes a plurality of lenticular lenses inclined at a tilt angle. Letting Hp and Vp respectively denote a pixel row-directional pitch and a pixel column-directional pitch pixels, where Hp>Vp, the tilt angle A satisfies the following equation:

$$A = \tan^{-1}\frac{b * Hp}{(3b + c) * Vp},$$

where c is −1 or 1, and b is a natural number that is greater than 1.

Let Lh and Lv respectively denote a row-directional lens pitch and a column-directional lens pitch of the lenticular lens. Each lens pitch of the lenticular lens may be configured to satisfy the following equation:

$$Lh:Lv = \frac{Hp}{3b+c} : \frac{Vp}{b}.$$

Let El denote a calculated viewing distance of a landscape mode of a three-dimensional image display that includes said viewpoint divider, Ep denote a calculated viewing distance of a portrait mode of the three-dimensional image display device, and E denote a human average viewing distance. El may satisfy the following equation:

$$El = \frac{Lh * E * 2}{Lh + Lv},$$

and Ep satisfies the following equation:

$$Ep = \frac{Lv * E * 2}{Lh + Lv}.$$

Let d denote a distance between a viewer eye and the viewpoint divider, g denote a distance between the viewpoint divider and a display panel, and kl denote a distance on the display panel that corresponds to a lens pitch of the viewpoint dividing unit in a landscape mode. The following equations may be satisfied:

$$El:d = \frac{kl}{2} : g$$

and Lh:d=kl:(d+g).

Let n denotes the number of pixels of proximity dots. kl may satisfy the following equation:

$$kl = \frac{2n * Hp}{3b + c},$$

and kp may satisfy the following equation:

$$kp = \frac{2n * Vp}{b}.$$

An exemplary embodiment of the present disclosure provides a viewpoint divider for a three-dimensional image display device that a plurality of parallax barriers inclined at a tilt angle. Letting Hp and Vp respectively denote a pixel row-directional pitch and a pixel column-directional pitch pixels, Hp>Vp, the tilt angle A satisfies the following equation:

$$A = \tan^{-1}\frac{b * Hp}{(3b + c) * Vp},$$

where c is −1 or 1, and b is a natural number that is greater than 1.

Let Lh and Lv respectively denote a row-directional opening pitch and a column-directional opening pitch of the parallax barrier. Each opening pitch of the parallax barrier may be configured to satisfy the following equation:

$$Lh:Lv = \frac{Hp}{3b+c} : \frac{Vp}{b}.$$

Let El denote a calculated viewing distance of a landscape mode of a three-dimensional image display device that includes said viewpoint divider, Ep denote a calculated viewing distance of a portrait mode of the three-dimensional image display device, and E denote a human average viewing distance. El may satisfy the following equation:

$$El = \frac{Lh * E * 2}{Lh + Lv},$$

and Ep may satisfy the following equation:

$$Ep = \frac{Lv * E * 2}{Lh + Lv}.$$

Let d denote a distance between a viewer eye and the viewpoint divider, g denote a distance between the viewpoint divider and a display panel, and kp denote a distance on the display panel that corresponds to the opening pitch of the viewpoint dividing unit in a portrait mode. The following equations may be satisfied:

$$Ep:d = \frac{kp}{2} : g$$

and Lv:d=kp:(d+g).

Let n denotes the number of pixels of proximity dots. Kl may satisfy the following equation:

$$kl = \frac{2n*Hp}{3b+c},$$

and kp may satisfy the following equation:

$$kp = \frac{2n*Vp}{b}.$$

According to the exemplary embodiment of the present disclosure, it is possible to provide an autostereoscopic three-dimensional image display device which can provide a portrait mode and a landscape mode using one viewpoint divider, suppress a moiré phenomenon, and synthetically improve image quality.

BRIEF DESCRIPTION OF THE DRAWINGS

FIG. 19A and FIG. 19B are tables showing various values of the three-dimensional image display device according to the designs of FIG. 15 to FIG. 18.

FIG. 21 is a table showing various values of the three-dimensional image display device according to the design of FIG. 20.

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Figure 1:
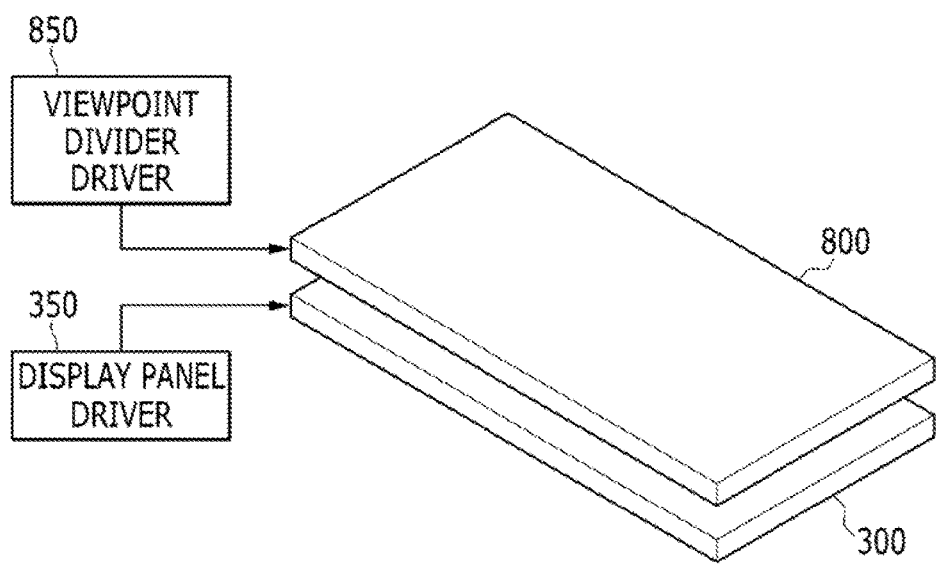
FIG. 1 is a schematic perspective view of a 3D image display device according to an exemplary embodiment of the present disclosure.

FIG. 1 is a schematic perspective view of a 3D image display device according to an exemplary embodiment of the present disclosure.

Referring to FIG. 1, the 3D image display device according to a present exemplary embodiment includes a display panel 300, a display panel driver 350, a viewpoint divider 800, and a viewpoint divider driver 850.

The display panel 300 displays an image, and may be one of various display devices such as a plasma display panel (PDP), a liquid crystal display (LCD), or an organic light emitting diode (OLED) display.

Figure 2:
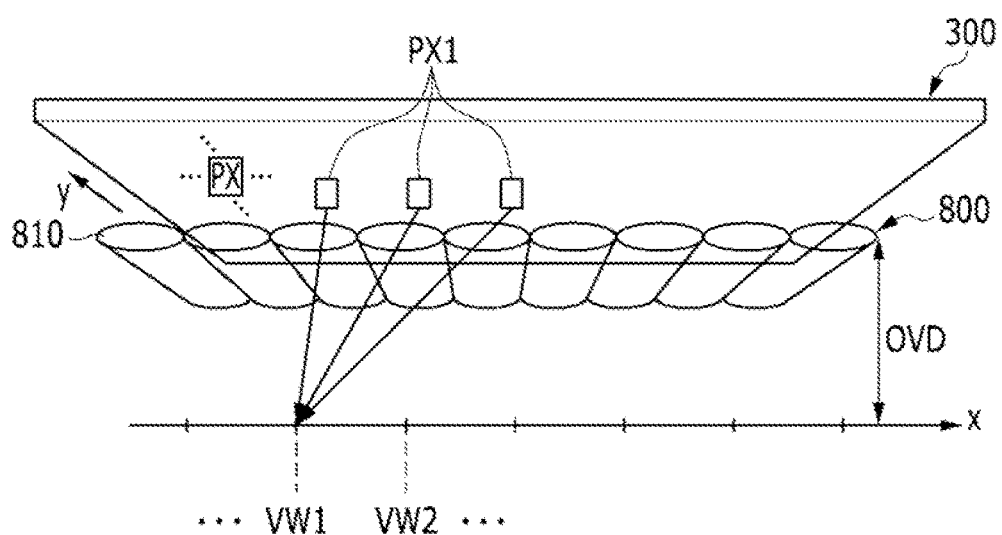
FIG. 2 is a schematic side perspective view of a 3D image display device according to an exemplary embodiment of the present disclosure.

FIG. 2 is a schematic side perspective view of a 3D image display device according to an exemplary embodiment of the present disclosure.

Referring to FIG. 2, the display panel 300 includes a plurality of signal lines and a plurality of pixels PX connected to the signal lines when viewed as an equivalent circuit. The pixels PX may be arranged substantially in a matrix form. In FIG. 2, a row direction is indicated by an x-axis direction, and a column direction is indicated by a y-axis direction. Each pixel PX may include a switching element such as a thin film transistor connected to the signal lines, and a pixel electrode connected thereto. The signal lines include a plurality of gate lines that transmit gate signals, referred to as "scanning signals", and a plurality of data lines that transmit data voltages.

Each pixel PX may uniquely display one primary color in a spatial division mode, or the plurality of pixels may alternately display primary colors over time in a temporal division mode, and as a result, a desired color may be displayed by either the spatial sum or the temporal sum of the primary colors. The primary colors may be various combinations, such as three primary colors or four primary colors, but the three primary colors red (R), green (G), and blue (B) are described as an example in a present exemplary embodiment. A set of pixels PX that display each primary color may together configure one dot. As a display unit of a 3D image, one dot may display white. The pixels PX of one pixel column may display the same primary color, but embodiments are not limited thereto, and the pixels PX arranged in a diagonal direction at a predetermined angle may display the same primary color.

The display panel driver 350 can transmit various driving signals, such as a gate signal and a data signal, to the display panel 300 to drive the display panel 300.

Referring to FIG. 2, the viewpoint divider 800 divides and transmits light of an image displayed by the pixels PX of the display panel 300 to viewpoints VP1, VP2, . . . corresponding to each pixel PX.

A distance between the 3D image display device and a plane for optimally viewing a 3D image is called an optimal viewing distance OVD. A viewpoint refers to a portion on an X-axis of the OVD plane where an image from each pixel PX, hereinafter referred to as a pixel image, is displayed through the viewpoint divider 800.

According to a present exemplary embodiment, each pixel PX of the display panel 300 corresponds to one viewpoint VW1, VW2, . . . , and pixel images of each pixel PX reach corresponding viewpoints VW1, VW2, . . . through the viewpoint divider 800.

A viewer may perceive different images by respective eyes at different viewpoints, and thus may perceive depth, that is, a 3D effect.

FIG. 2 illustrates a finite number of viewpoints VP1, VP2, . . . positioned at the OVD plane. For example, when a first viewpoint VW1 is the viewpoint from which an image displayed by a first pixel PX1 is viewed, the light from each first pixel PX1 may reach the first viewpoint VW1 through the viewpoint divider 800.

Figure 3:
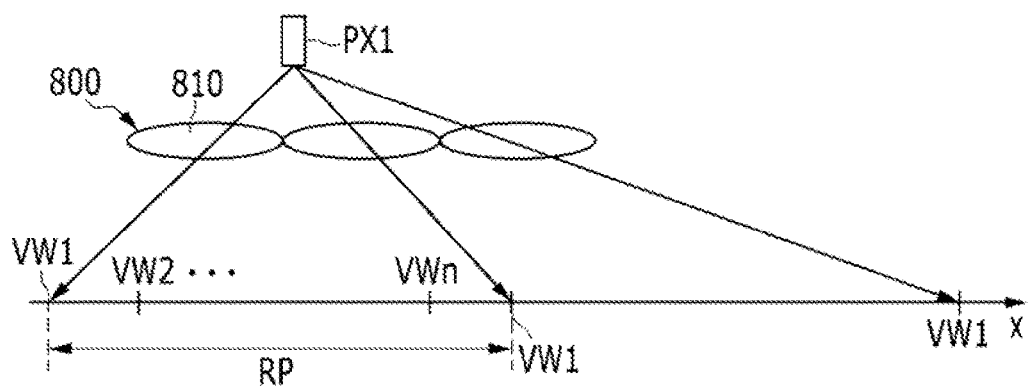
FIG. 3 illustrates a viewpoint divided by a viewpoint divider when a viewpoint dividing unit is a lenticular lens.
Figure 4:
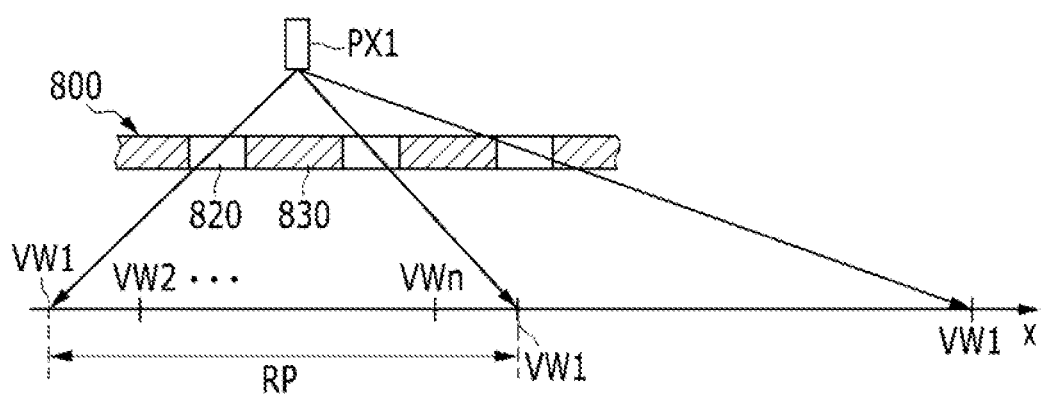
FIG. 4 illustrates a viewpoint divided by a viewpoint divider when a viewpoint dividing unit is a parallax barrier.

FIG. 3 illustrates a viewpoint divided by a viewpoint divider when a viewpoint dividing unit is a lenticular lens, and FIG. 4 illustrates a viewpoint divided by a viewpoint divider when a viewpoint dividing unit is a parallax barrier.

Referring to FIG. 3 or FIG. 4, the image displayed by the display panel 300 may reach a viewpoint VW1-VWn (n is a natural number) of a unit view area RP having a predetermined viewing angle through the viewpoint divider 800. That is, the viewpoints VW1-VWn are present in any one unit view area RP, and a corresponding viewpoint for each pixel PX may be determined based on the position the light reaches in the unit view area RP.

The unit view area RP may be periodically repeated on the OVD plane, and a sequence of the viewpoints VW1-VWn may be repeated in each unit view area RP.

Referring to FIG. 2 and FIG. 3, the viewpoint divider 800 of a present exemplary embodiment includes a plurality of viewpoint dividing units, and the viewpoint dividing unit may include a plurality of lenticular lens 810 arranged in one direction. Each lenticular lens 810 may extend in another direction. A color arrangement of an adjacent pixel row for each lenticular lens 810 may be different. That is, the primary colors displayed by the first pixel of the adjacent pixel row for each lenticular lens 810 may be different. For this, the extending direction of each lenticular lens 810 may be inclined to form an acute angle with the y-axis direction of the column direction.

Referring to FIG. 4, the viewpoint divider 800 according to an exemplary embodiment of the present disclosure includes a plurality of viewpoint dividers, and the plurality of viewpoint dividers may be a plurality of openings 820 in the parallax barrier. The parallax barrier may further include a plurality of light blocking parts 830 that alternate with the openings 820. The arrangement direction of the openings 820 in one line may be inclined to form an acute angle with the y-axis direction of a column direction, like the extending direction of the lens. When the viewpoint divider 800 includes a parallax barrier instead of a lenticular lens 810, it may be assumed that the extending direction of a lenticular lens corresponds to an arrangement direction of the opening 820.

In FIG. 1 and FIG. 2, the viewpoint divider 800 is positioned between the display panel 300 and the viewer, but embodiments are not limited thereto.

The viewpoint divider driver 850 is connected to the viewpoint divider 800 to generate a driving signal to drive the viewpoint divider 800.

Figure 5:
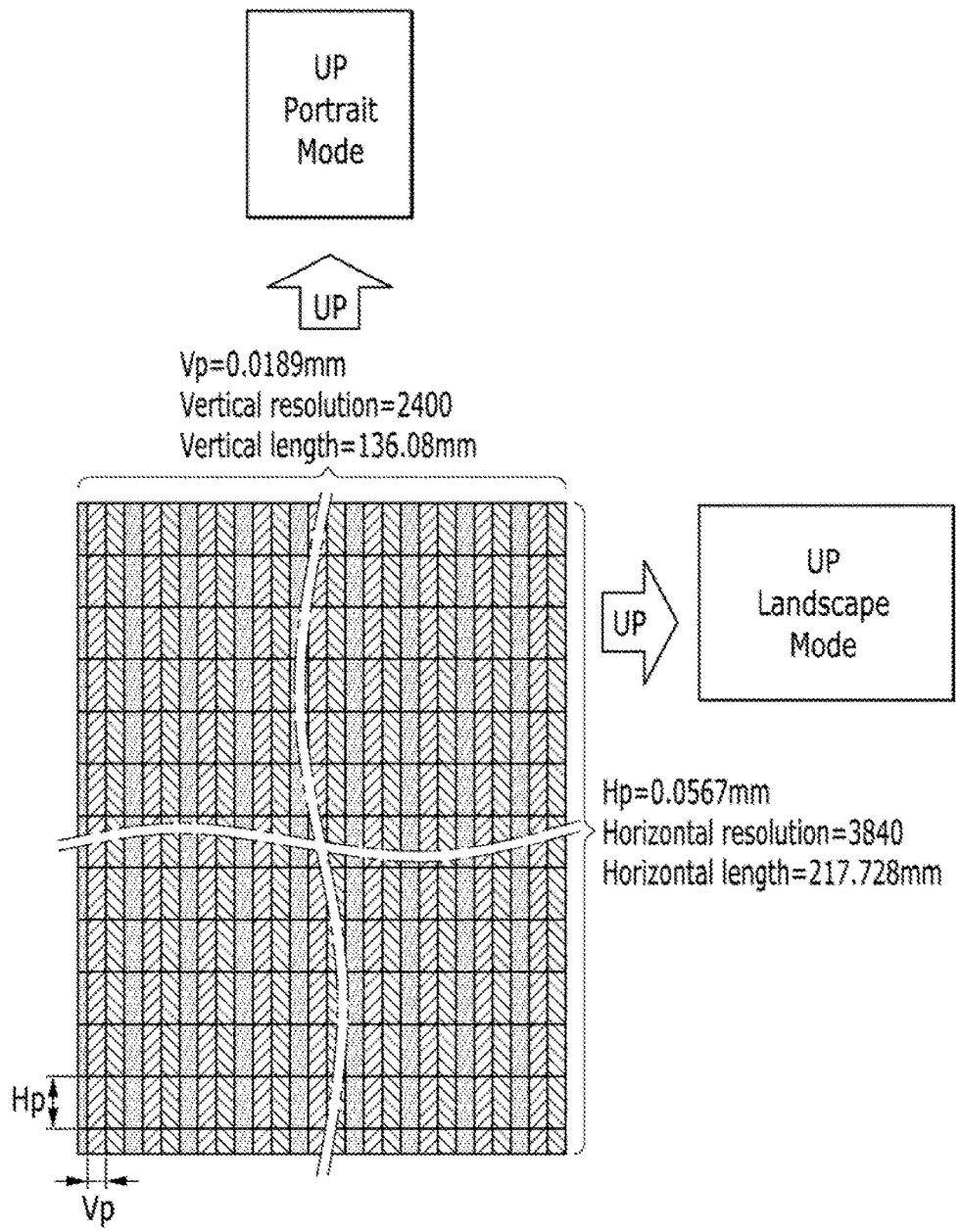
FIG. 5 is an exemplary view that illustrates a portrait mode and a landscape mode.

FIG. 5 is an exemplary view that illustrates a portrait mode and a landscape mode.

Landscape mode refers to a case in which a row-directional pitch Hp of a pixel PX is larger than a column-directional pitch Vp.

Portrait mode refers to a case in which the column-directional pitch of the pixel PX is larger than the row-directional pitch.

A viewer can select landscape mode or portrait mode by rotating the three-dimensional image display device. The resolution of the display panel 300 and data applied to a pixel may vary based on the mode.

Landscape mode may also be referred to as a horizontal mode, and portrait mode may also be referred to as a vertical mode.

In a present disclosure, the row-directional pitch Hp and the column-directional pitch Vp of a pixel PX will be described based on landscape mode. Accordingly, the row-directional pitch Hp of the pixel PX is greater than the column-directional pitch Vp.

In this case, the row-directional pitch Hp and the column-directional pitch Vp may satisfy the following Equation 1.

$$Hp = 3*Vp \qquad \text{[Equation 1]}$$

The following embodiments of the present disclosure are explained based on the specification described on FIG. 5, wherein Hp=0.0567 mm, horizontal resolution=3840, and horizontal length=217.728 mm, and wherein Vp=0.0189 mm, vertical resolution=2400, and vertical length=136.08 mm.

However, in some cases, such as in portrait mode, the column-directional pitch of the pixel may be larger than the row-directional pitch.

Figure 6:
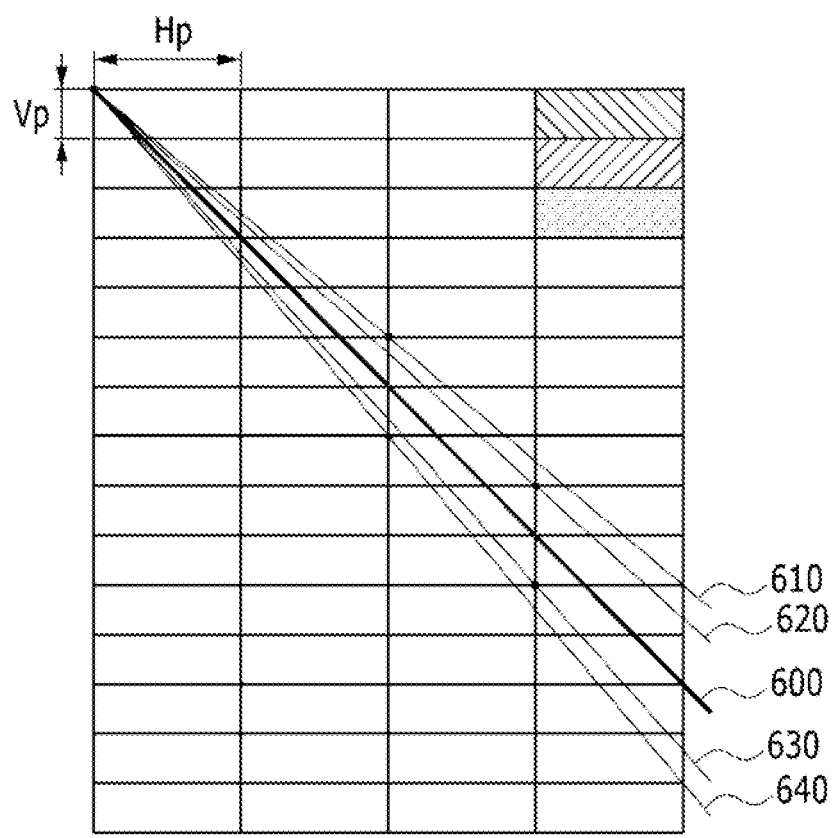
FIG. 6 is an exemplary view of a viewpoint dividing unit that is inclined at a tilt angle according to an exemplary embodiment of the present disclosure.

FIG. 6 is an exemplary view of a viewpoint dividing unit that is inclined at a tilt angle according to an exemplary embodiment of the present disclosure.

When a 3D image is displayed using one viewpoint divider 800 in landscape mode or portrait mode, a tilt angle of the viewpoint dividing unit is formed at about 45 degrees.

However, when the tilt angle is 45 degrees, a moiré pattern may be generated. This is because of an increased defocus amount needed to remove the moiré pattern. In addition, as the defocus amount increases, a crosstalk amount also increases.

Accordingly, in a present disclosure, the viewpoint dividing unit may be inclined at a tilt angle that satisfies the following Equation 2. This tilt angle A may be defined based on the row-directional pitch Hp and the column-directional pitch Vp of a pixel PX of the display panel 300.

$$A = \tan^{-1} \frac{b*Hp}{(3b+c)*Vp} \qquad \text{[Equation 2]}$$

Herein, c may be −1 or 1, and b may be a natural number that is greater than 1.

A line 600 indicates the case that the tilt angle is 45 degrees.

The tilt angle of a present exemplary embodiment may increase or decrease by one pixel in a vertical direction from the line 600.

A line 610 indicates the tilt angle where c=−1 and b=2.
A line 620 indicates the tilt angle where c=−1 and b=3.
A line 630 indicates the tilt angle where c=1 and b=3.
A line 640 indicates the tilt angle where c=1 and b=2.

Figure 7:
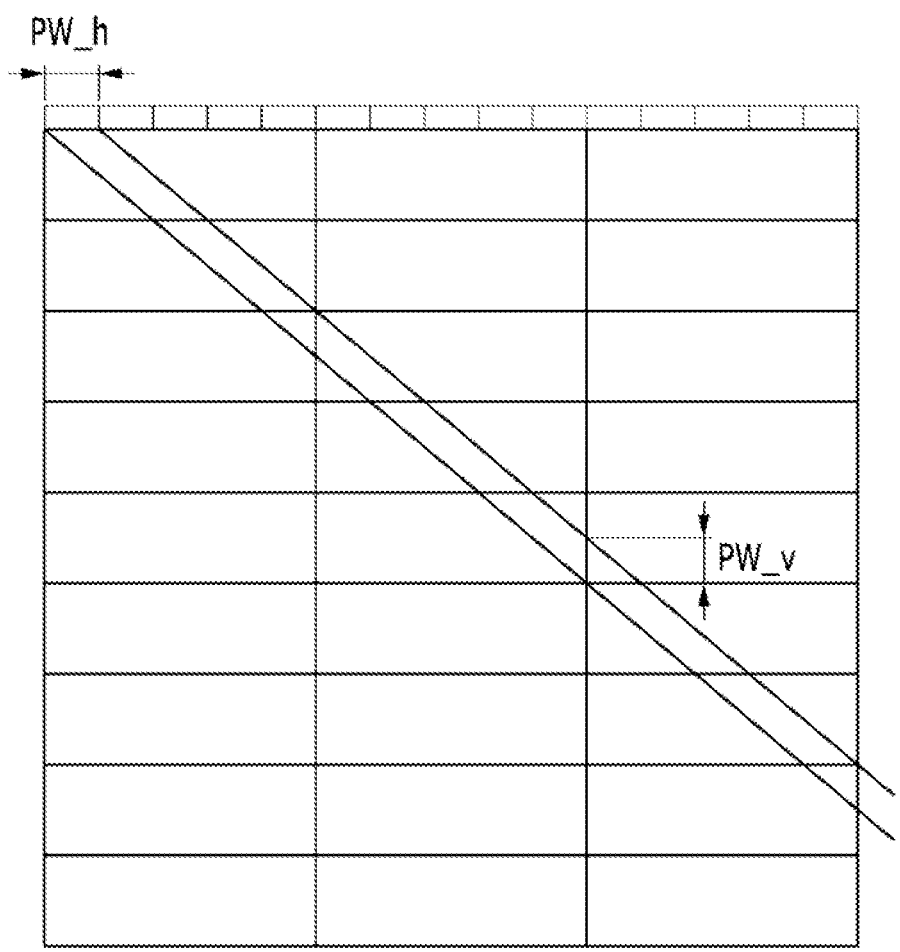
FIG. 7 and FIG. 8 are exemplary views that illustrate a row-directional width and a column-directional width of each pixel that is observed by a viewpoint dividing unit according to an exemplary embodiment of the present disclosure.
Figure 8:
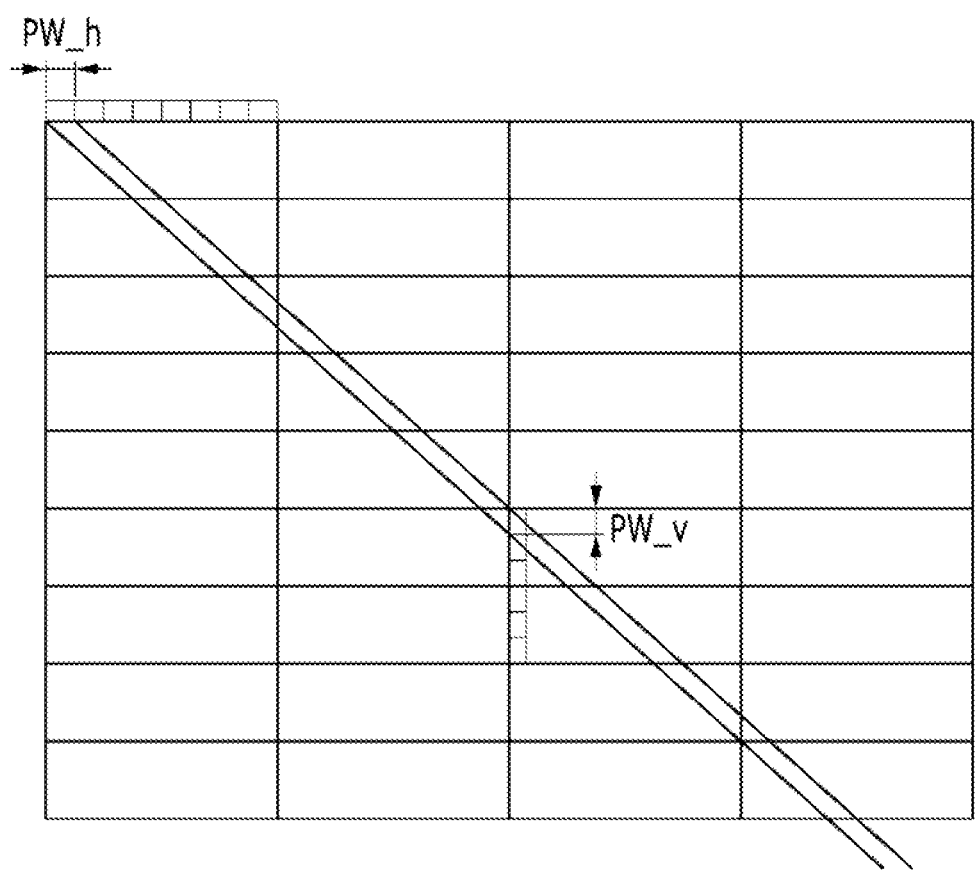

FIG. 7 and FIG. 8 are exemplary views that illustrate a row-directional width and a column-directional width of each pixel that is observed at a viewpoint dividing unit according to an exemplary embodiment of the present disclosure.

A row-directional width PW_h and a column-directional width PW_v of each pixel PX that is observed on the display panel 300 through the viewpoint dividing unit can be controlled by adjusting a focal distance based on the tilt angle of the viewpoint dividing unit.

According to a present exemplary embodiment, the row-directional width PW_h of each pixel PX that is observed at the viewpoint dividing unit may be calculated from PW_h=Hp/(3b+c).

In addition, the column-directional width PW_v of each pixel PX that is observed at the viewpoint dividing unit according to a present exemplary embodiment may be calculated from PW_v=Vp/b.

In FIG. 7, the row-directional width PW_h and column-directional width PW_v of each pixel PX that is observed at the viewpoint dividing unit is illustrated for a tilt angle corresponding to c=−1 and b=2 according to an aforementioned exemplary embodiment.

In FIG. 8, the row-directional width PW_h and column-directional width PW_v of each pixel PX that is observed at the viewpoint dividing unit is illustrated for a tilt angle corresponding to c=−1 and b=3 according to an aforementioned exemplary embodiment.

Figure 9:
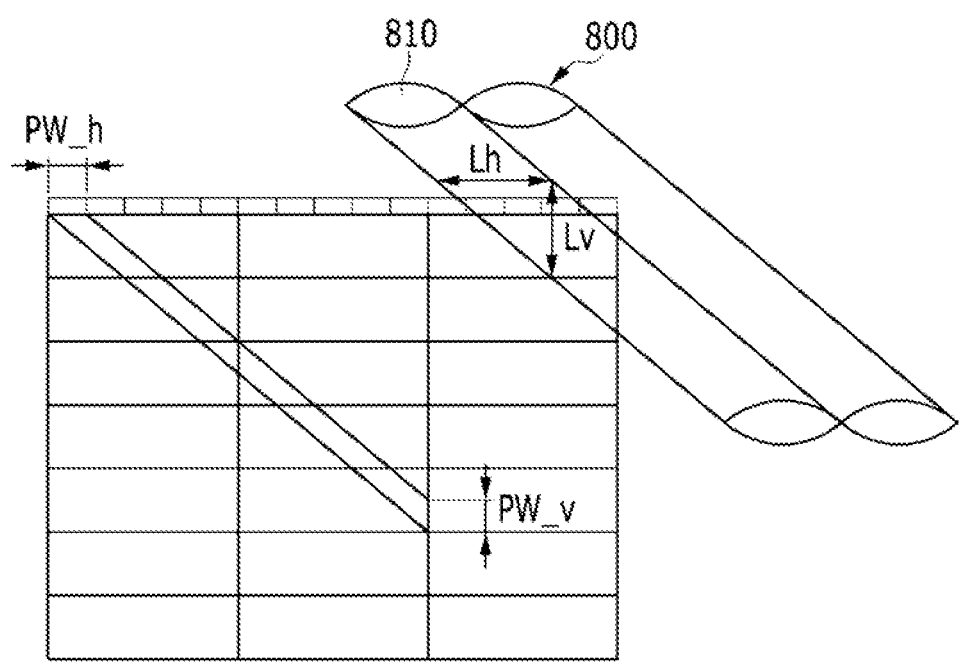
FIG. 9 is an exemplary view that illustrates a row-directional lens pitch and a column-directional lens pitch when a viewpoint dividing unit is a lenticular lens.

FIG. 9 is an exemplary view that illustrates a row-directional lens pitch Lh and a column-directional lens pitch Lv when a viewpoint dividing unit is a lenticular lens.

A row-directional lens pitch Lh and a column-directional lens pitch Lv of the lenticular lens 810 according to a present exemplary embodiment may to satisfy the following Equation 3.

$$Lh : Lv = \frac{Hp}{3b+c} : \frac{Vp}{b} \quad \text{[Equation 3]}$$

Figure 10:
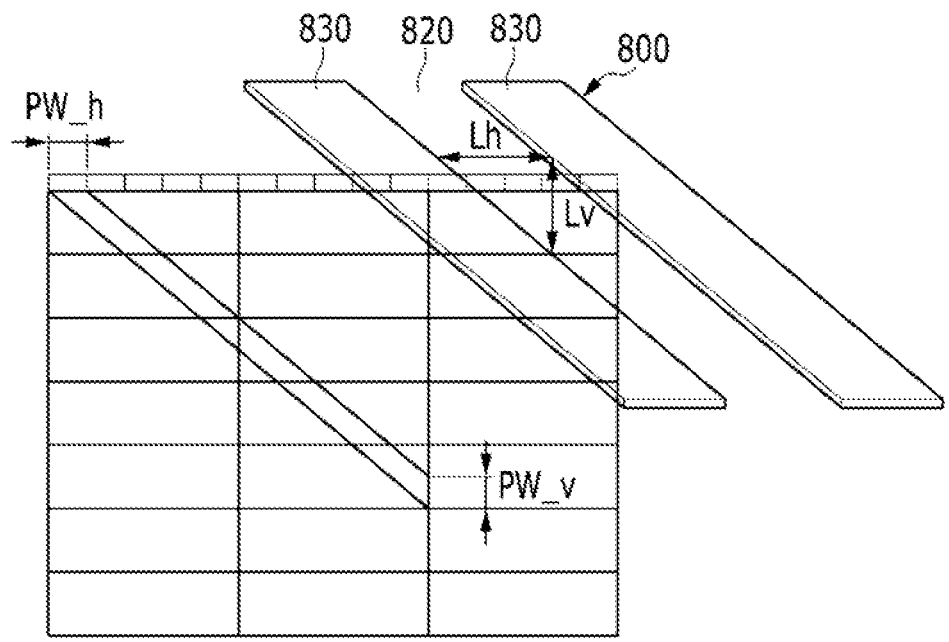
FIG. 10 is an exemplary view that illustrates a row-directional lens pitch and a column-directional lens pitch when a viewpoint dividing unit is a parallax barrier.

FIG. 10 is an exemplary view that illustrates a row-directional lens pitch Lh and a column-directional lens pitch Lv when a viewpoint dividing unit is a parallax barrier.

The pitch configuration principles of an opening 820 of the parallax barrier may be similar to the configuration principles when the viewpoint dividing unit is the lenticular lens in FIG. 9.

According to a present exemplary embodiment, the row-directional pitch Lh of the opening 820 of the parallax barrier and the column-directional pitch Lv of the opening 820 may be configured satisfy the ratio of Equation 3.

Figure 11:
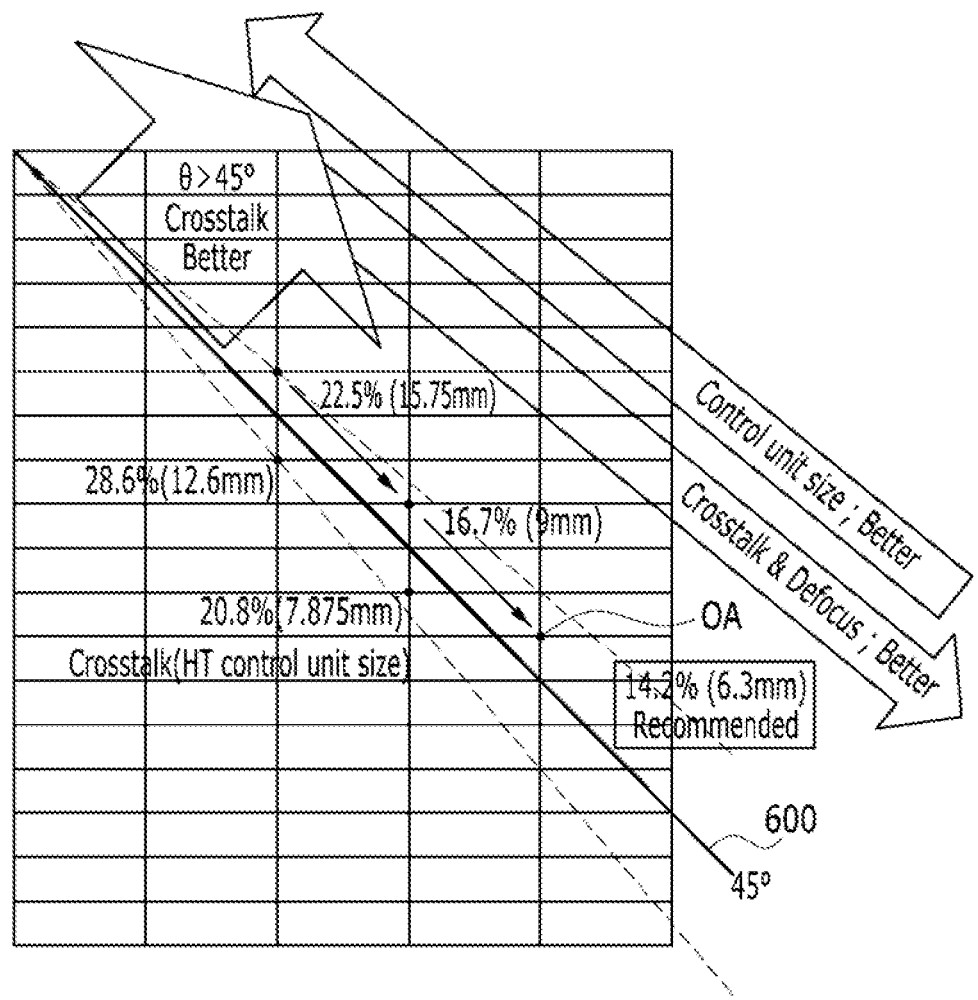
FIG. 11 is an exemplary view that illustrates crosstalk, a control unit magnitude, and a defocus amount according to a tilt angle.

FIG. 11 is an exemplary view that illustrates crosstalk, a control unit magnitude, and a defocus amount according to a tilt angle.

Crosstalk refers to a phenomenon in which a left eye image is seen by a right eye, or a right eye image is seen by a left eye. Crosstalk makes it challenging to watch normal 3D images.

Head tracking may reduce crosstalk by tracking the movement of a viewer and exchanging dots at which the left-eye image and the right-eye image are displayed. For example, as the viewer moves, crosstalk increases. When crosstalk reaches 50%, a head tracking function may be performed by exchanging the dots at which the left-eye image and the right-eye image are displayed.

The control unit of the head tracking function refers to a minimum width to be detected for exchanging pixels at which the left-eye image and the right-eye image are displayed to correspond to the movement of the viewer at the OVD plane. In this case, the control unit may be a width corresponding to one dot at the OVD plane.

The defocus amount may be adjusted to remove the moiré patterns. However, if a defocus amount is too great, crosstalk may be generated.

In FIG. 11, the unit of the crosstalk is a percentage (%), and the magnitude of the control unit of a head tracking HT is given in parentheses as millimeters (mm).

Referring to line 600, a first condition for reducing crosstalk is that the tilt angle should be greater than 45 degrees.

A second condition is that crosstalk and the defocus amount should decrease as two points serving as the reference of the tilt angle become farther from each other.

A third condition is that the control unit should increase as the two points serving as the reference of the tilt angle become closer to each other.

For example, an optimal tilt angle may be determined by first considering the first condition and then considering the second condition and the third condition. The magnitude of the control unit for the third condition may be equal to or greater than 5 mm. If the control unit increases, the defocus amount may also be increased, which may generate a moiré pattern.

In an exemplary embodiment of FIG. 11, when the tilt angle corresponds to c=−1 and b=4, crosstalk is 14.2% and the magnitude of the control unit was 6.3 mm. This was an optimal tilt angle OA.

Figure 12A:
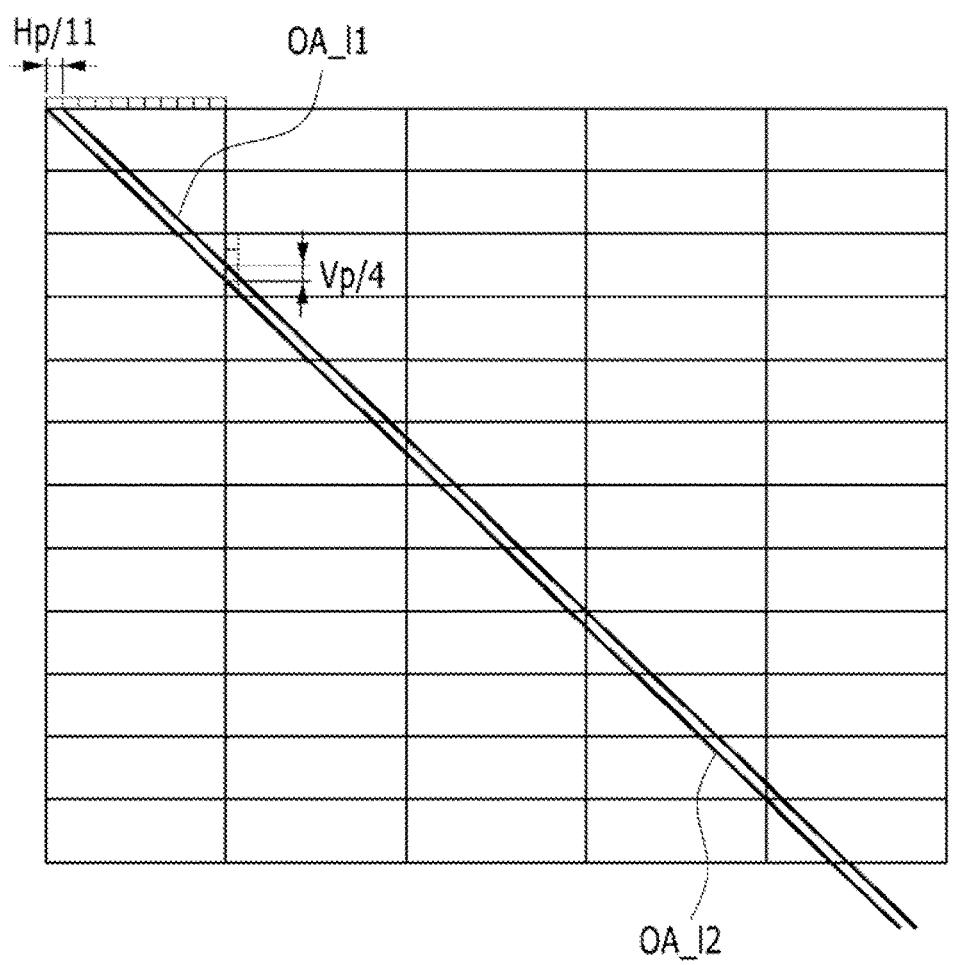
FIG. 12A and FIG. 12B are exemplary views that illustrate a process of calculating a defocus amount.
Figure 12B:
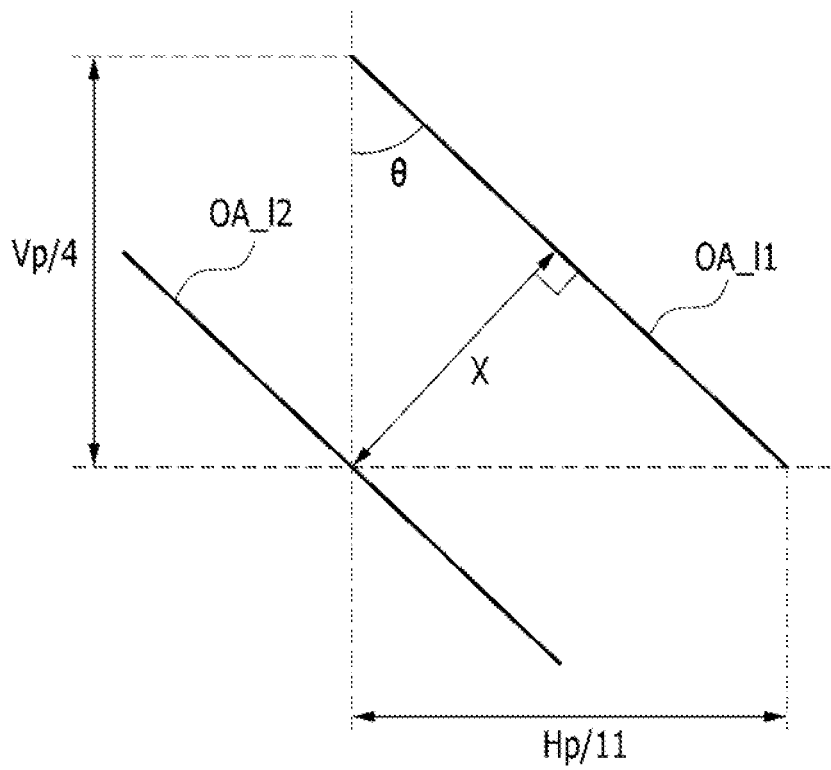

FIG. 12A and FIG. 12B are exemplary views that illustrate a process of calculating a defocus amount to remove a moiré pattern.

Defocusing can be implemented by causing the viewpoint dividing unit to deviate from accurate focus on the display panel 300.

Therefore, the display panel 300 can be viewed by a user through a plurality of planes, and not as a plurality of lines. If the display panel 300 is viewed by the user through a plurality of lines, the moiré pattern may be observed by the user because each of the plurality of lines passes the pixel and black matrix alternatively.

The defocus amount to remove the moiré pattern can be calculated in landscape mode and portrait mode independently of the optimal tilt angle OA of FIG. 11.

In this case, the defocus amount of landscape mode may be Vp/4, and the defocus amount of portrait mode may be Hp/11.

FIG. 12A illustrates the defocus amount and the tilt angle of the viewpoint dividing unit. In FIG. 12A, a region between a line OA_I1 and a line OA_I2 is defocused.

In this case, as shown in FIG. 12B, the region is defocused by Vp/4 in the vertical direction and by Hp/11 in a horizontal direction, and thus no inconsistency occurs. In the case of a 10.1 inch display panel 300, an actual defocused width may be calculated from the following Equation 4.

$$\tan\theta = \frac{12}{11},$$ [Equation 4]

$$\sin\theta = \frac{4x}{Vp},$$

$$x = Vp * \frac{\sin\theta}{4} = Vp * \frac{\sin\left(\tan^{-1}\frac{12}{11}\right)}{4} = 0.003483$$

Figure 13A:
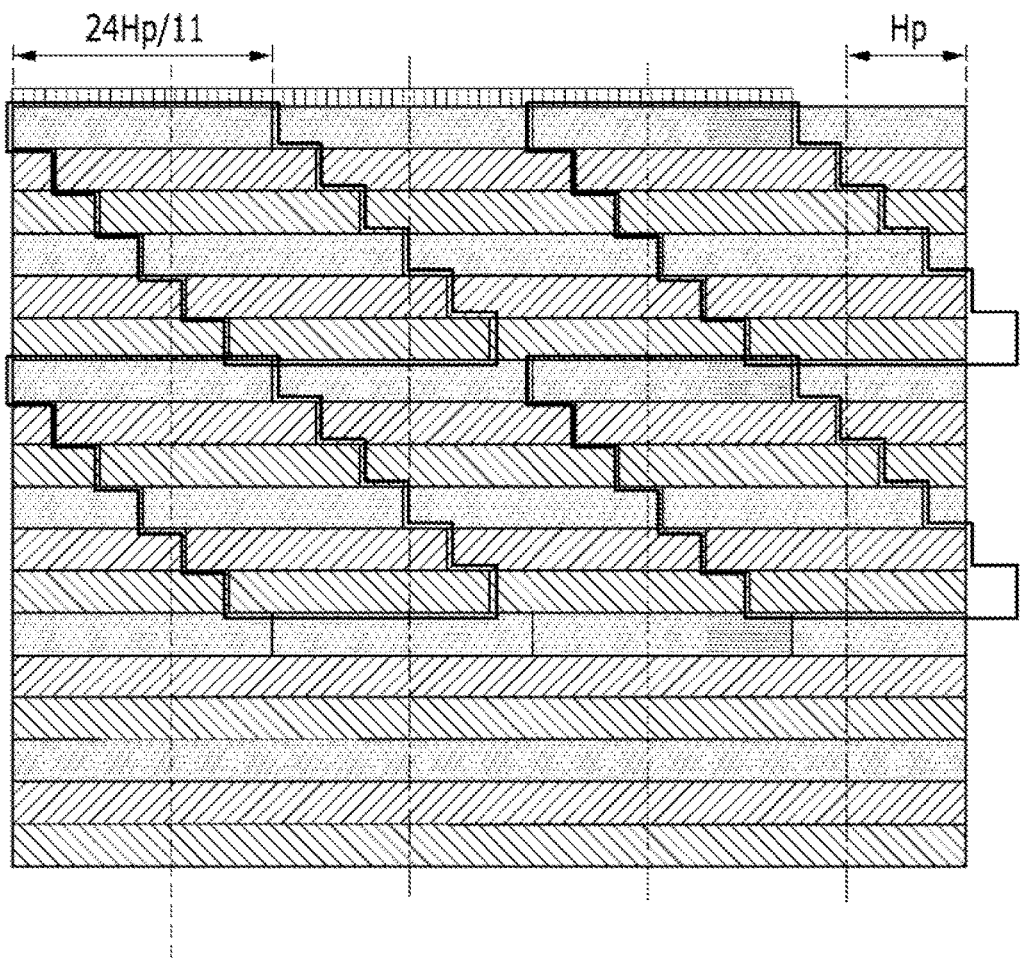
FIG. 13A and FIG. 13B are exemplary views that illustrate resolution of a 3D mode and a 2D mode in a landscape mode.
Figure 13B:
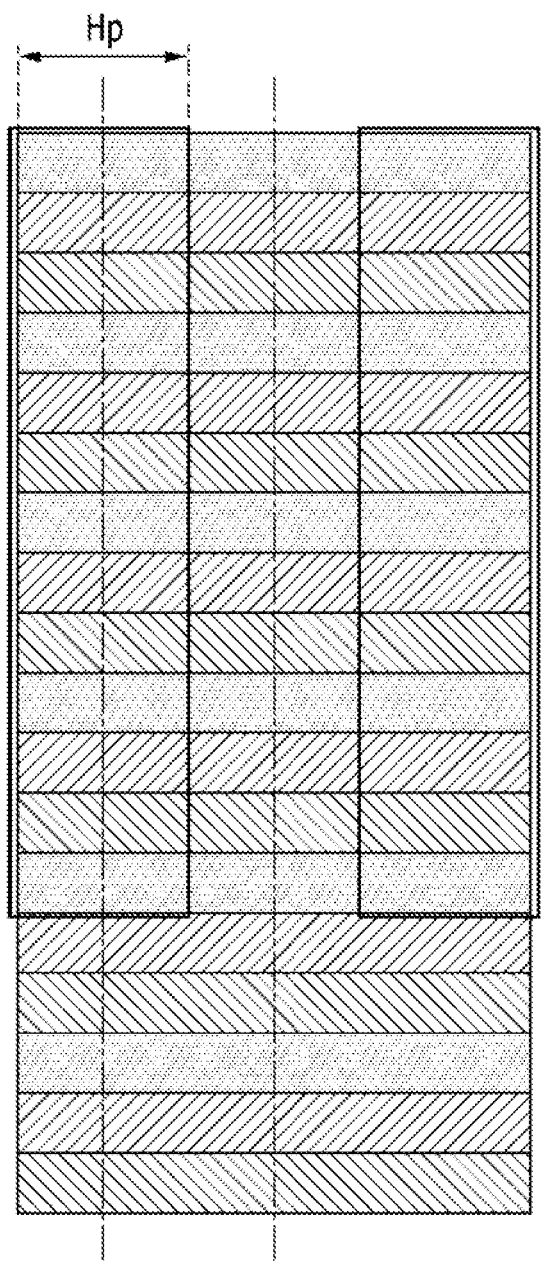

FIG. 13A and FIG. 13B are exemplary views that illustrate resolution of a 3D mode and a 2D mode in landscape mode.

FIG. 13A and FIG. 13B illustrate an image that is actually observed when a vertical line and a horizontal line are displayed in landscape mode.

FIG. 13B is in 2D mode, and one line of white and black may be displayed at 1 Hp pitch.

FIG. 13A is in 3D mode, and white and black lines may be displayed at 24 Hp/11 pitches. In this case, the resolution is degraded by 11/24 in the horizontal direction. The resolution in the vertical direction is maintained.

Figure 14A:
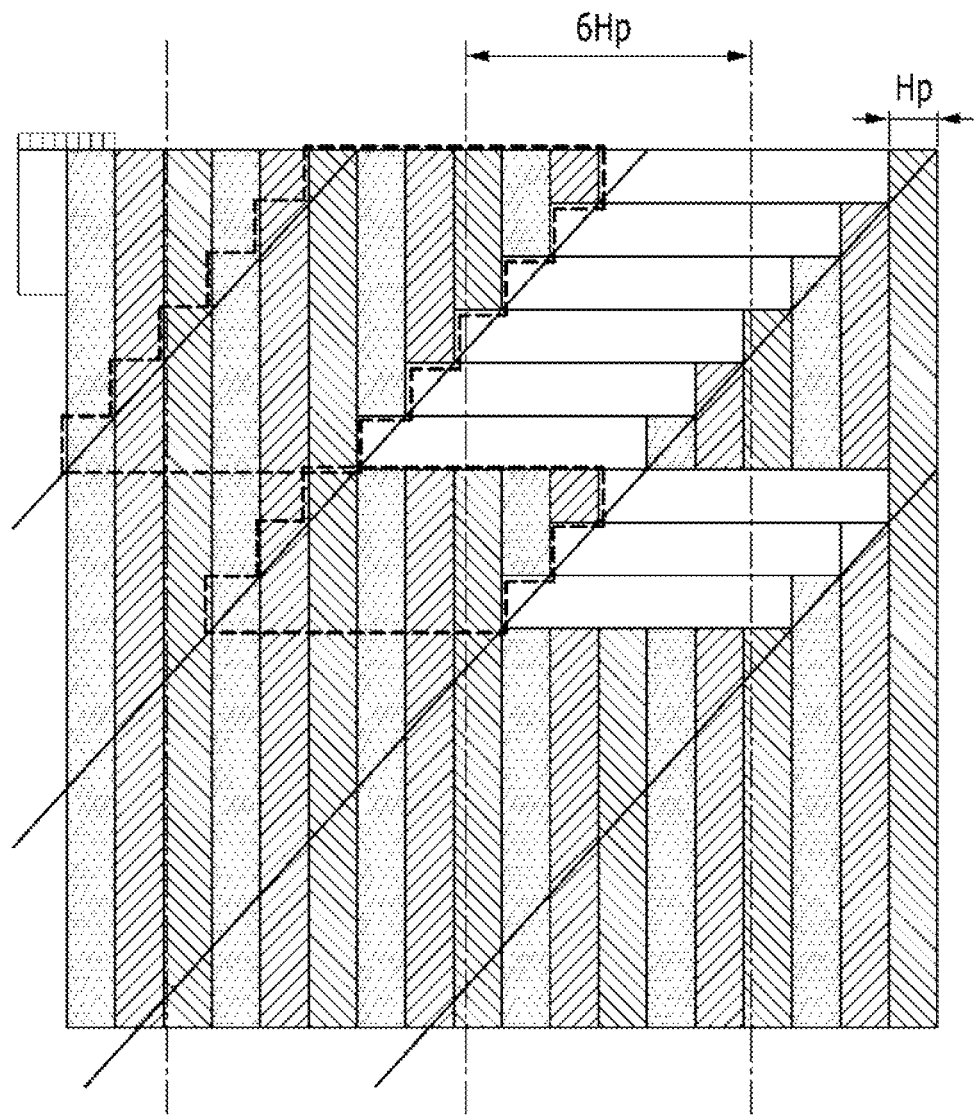
FIG. 14A and FIG. 14B are exemplary views that illustrate resolution of a 3D mode and a 2D mode in a portrait mode.
Figure 14B:
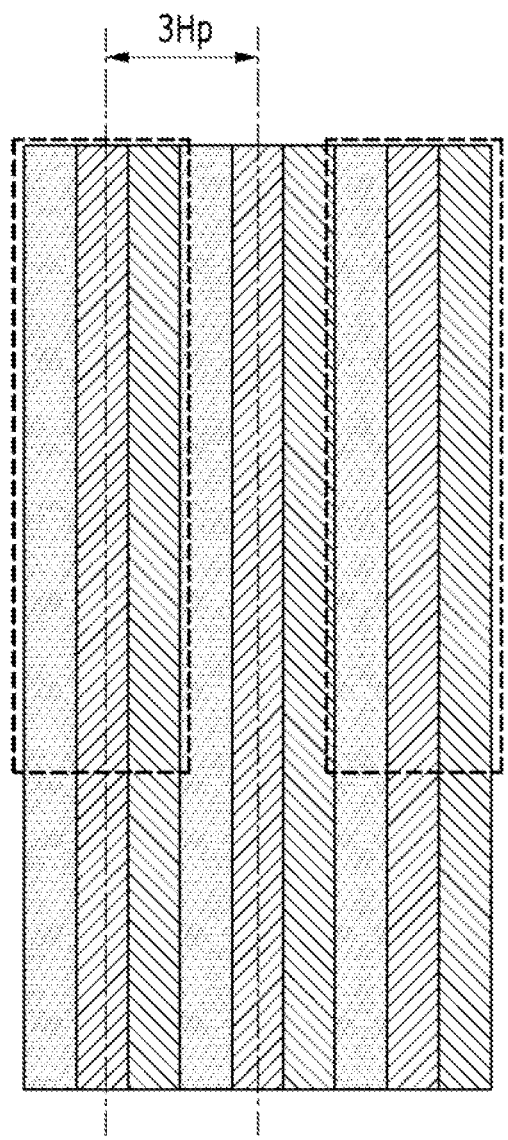

FIG. 14A and FIG. 14B are exemplary views that illustrate resolution of 3D mode and 2D mode in portrait mode.

FIG. 14A and FIG. 14B illustrate an image that is actually observed when the vertical line and the horizontal line are displayed in portrait mode.

FIG. 14B is in 2D mode, and one line of white and one line of black may be displayed at a 3 Hp pitch.

FIG. 14A is in 3D mode, and white lines and black lines may be displayed at a 6 Hp pitch. Here, the resolution is degraded by ½ in the horizontal direction. In the vertical direction, separation can be performed by each line with different ratios of RGB. Accordingly, color information is degraded, while the vertical resolution is maintained.

Figure 15:
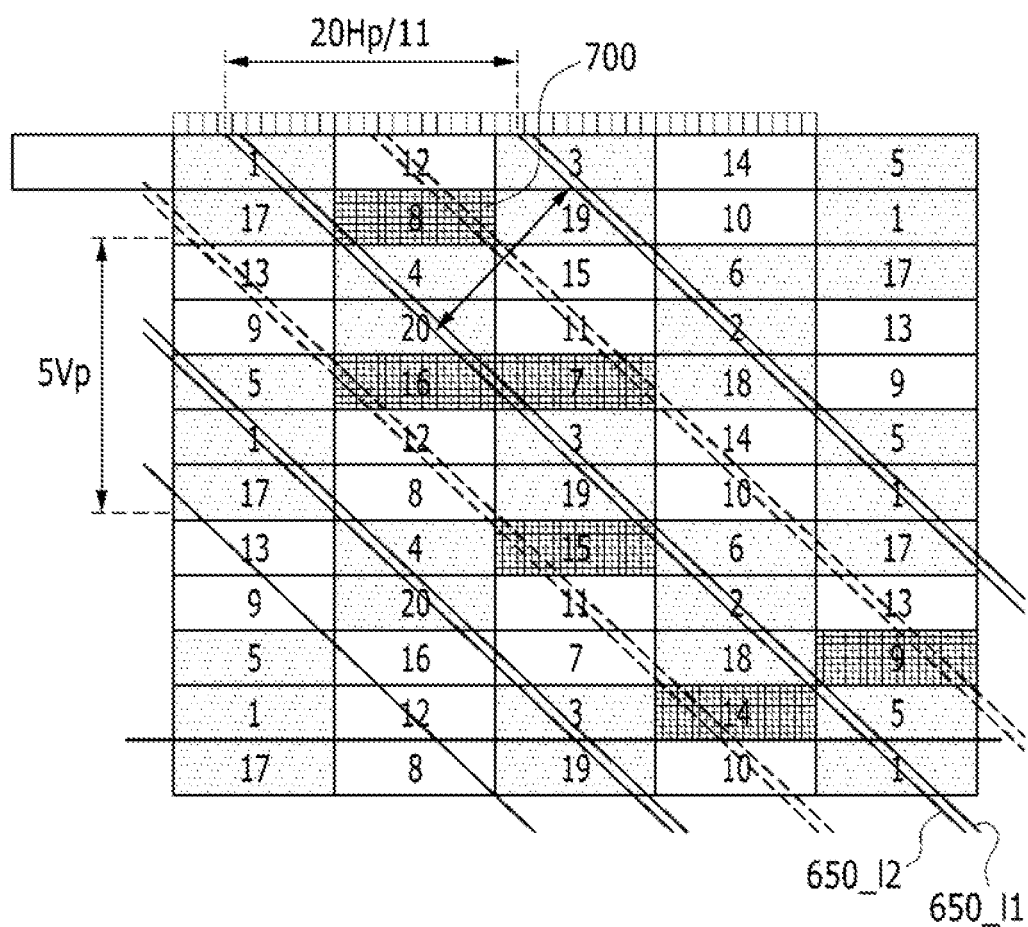
FIG. 15 illustrates a pixel design for configuring a lens pitch according to an exemplary embodiment of the present disclosure.

FIG. 15 illustrates a pixel design for configuring a lens pitch according to an exemplary embodiment of the present disclosure.

Proximity dots (PD) indicate the set of a first pixel PX1 that represents the image for any one viewpoint and pixels positioned between the first pixel PX1 and a second pixel PX2, when viewed through either the same lenticular lens or parallax barrier opening arranged in one line, when the second pixel PX2 is next to the same viewpoint. The pixels of the PD may display the image of different viewpoints or may display the image of the same viewpoints.

Let the tilt angle θ be defined by the following Equation 5; then the number n of pixels of the PD can be obtained by the following Equation 6.

$$\tan\theta = \frac{b*Hp}{m*Vp}$$ [Equation 5]

$$n = b + m - 1$$ [Equation 6]

In the above equations and the following equations, m may be understood to be m=3b+c by matching it with Equation 2.

In FIG. 15, four of the pixels constituting the PD may be removed to configure the lens pitch to 2 HP or 6 VP or less.

Specifically, FIG. 15 illustrates the case when b=4 and m=11, and the pixel number n of the PD is calculated as n=4+11−1=14, but 4 pixels are removed from the PD. Accordingly, n is 10. In this case, crosstalk is increased, but the NA is reduced.

For example, pixels 8, 16, 7, and 15 which are excluded from pixels 1, 17, 8, 4, 20, 16, 7, 3, 19, 15, 6, 2, 18, and 5 that constitute the PD that overlaps a defocused region between a line 650_I1 and a line 650_I2.

A row-directional width kl on the display panel 300 corresponding to the row-directional pitch Lv of the viewpoint dividing unit can be calculated from the following Equation 7, and a column-directional width kp can be calculated from the following Equation 8. Equations 7 and 8 may be respectively obtained by multiplying the values PW_h and PW_v by a value (2n) obtained by adding the number of the pixels of left eye proximity dots and right eye proximity dots.

$$kl = 2n*Hp/m = 20Hp/11$$ [Equation 7]

$$kp = 2n*Vp/b = 5Vp$$ [Equation 8]

In this case, as described above with reference to FIG. 12, the defocus amounts become Hp/11 and Vp/4, respectively.

An entire area of the region defocused between the line 650_I1 and the line 650_I2 is 176 (=8*2*11)

A unit of measure may be defined in terms of a unit lattice 700, as shown in FIG. 15. In this case, each pixel may be defined by an 8*22 unit lattice 700.

In same way, an area of the crosstalk region may be obtained as 25=3*3+2*8. Accordingly, a crosstalk incidence rate is obtained as 14.2%=100*(25/176). This crosstalk incidence rate is a minimum value, and may increase in another defocused region.

Figure 16:
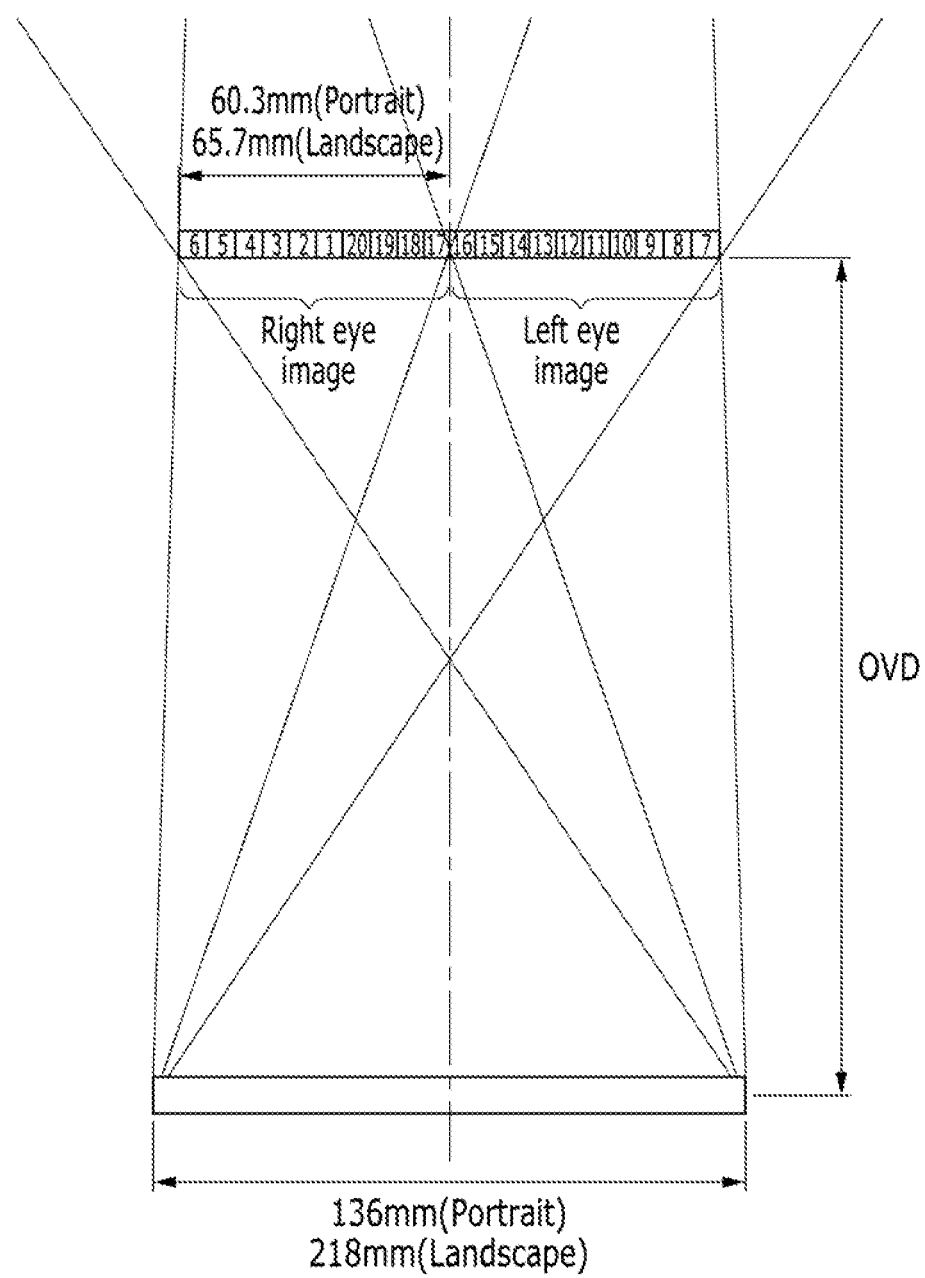
FIG. 16 illustrates a design of an optimal viewing distance using a calculated viewing distance.

FIG. 16 illustrates a design of an optimal viewing distance using a calculated viewing distance.

A ratio of the row-directional pitch Lh and the column-directional pitch Lv of the viewpoint dividing unit may be the same as a ratio of kl and kp. Accordingly, the following Equation 9 may be satisfied.

$$Lh:Lv = kl:kp = 2n*Hp/m:2n*Vp/b = 20Hp/11:5Vp = 60/11:5 = 12:11$$ [Equation 9]

As described above, since the row-directional pitch Lh and the column-directional pitch Lv of the viewpoint dividing unit differ from each other, an average La of two pitches may be adjusted to correspond to the viewing distance when the optimal viewing distance is determined. In this case, an equation La=(Lh+Lv)/2 may be satisfied.

Further, the viewing distance may be the human average viewing distance E.

In this case, the calculated viewing distance El of landscape mode can satisfy an equation La:E=Lh:El. Accordingly, El can satisfy the following Equation 10.

$$El = \frac{Lh*E*2}{Lh+Lv}$$ [Equation 10]

The calculated viewing distance Ep of portrait mode can satisfy an equation La:E=Lv:Ep. Accordingly, Ep can satisfy the following Equation 11.

$$Ep = \frac{Lv*E*2}{Lh+Lv}$$ [Equation 11]

In a present exemplary embodiment, the average La obtained by using the aforementioned equations may be 115 Hp/66=(20Hp/11+5Hp/3)/2. In this case, E may be 63 mm.

In a present exemplary embodiment, the calculated viewing distance El of landscape mode may be obtained as 65.7 mm=66*63*20/(11*115) from an equation 115/66:63=20/11:El.

A viewing distance Ep of portrait mode may be obtained as 60.3 mm=66*63*5/3*115 from an equation 115/66:63=5/3:Ep.

Figure 17:
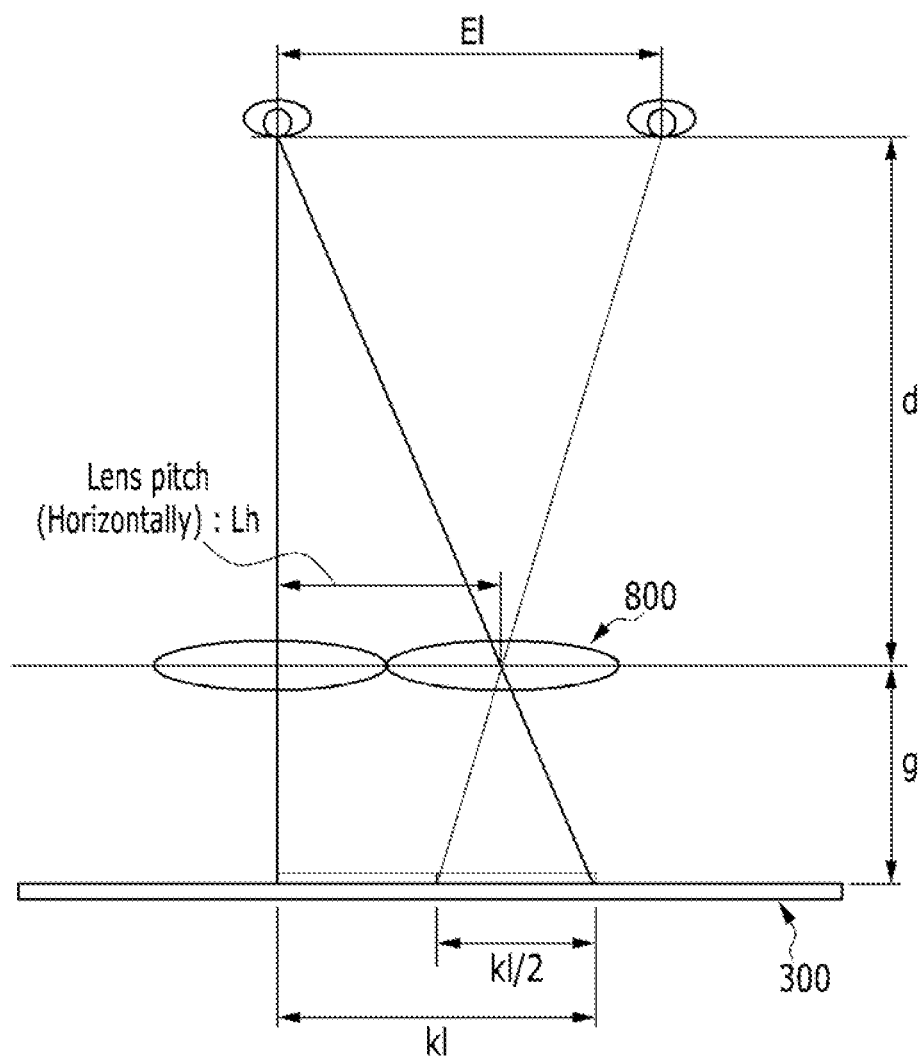
FIG. 17 illustrates a three-dimensional image display device using a calculated viewing distance in a landscape mode.

FIG. 17 illustrates a three-dimensional image display device using a calculated viewing distance in landscape mode.

El or Ep may be used to calculate the optimal viewing distance. The case of using El is illustrated in an exemplary embodiment of FIG. 17.

Let d denote a distance between a viewer eye and the viewpoint divider, i.e., the optimal viewing distance, g denote a distance between the viewpoint divider 800 and the display panel 300, and kl denote a distance on the display panel 300 that corresponds to the pitch Lv of the lens 810 of the viewpoint dividing unit 800 in the landscape mode; then the following Equations 12 and 13 may be satisfied.

$$El : d = \frac{k1}{2} : g \qquad \text{[Equation 12]}$$

$$Lh : d = k1 : (d + g) \qquad \text{[Equation 13]}$$

Figure 18:
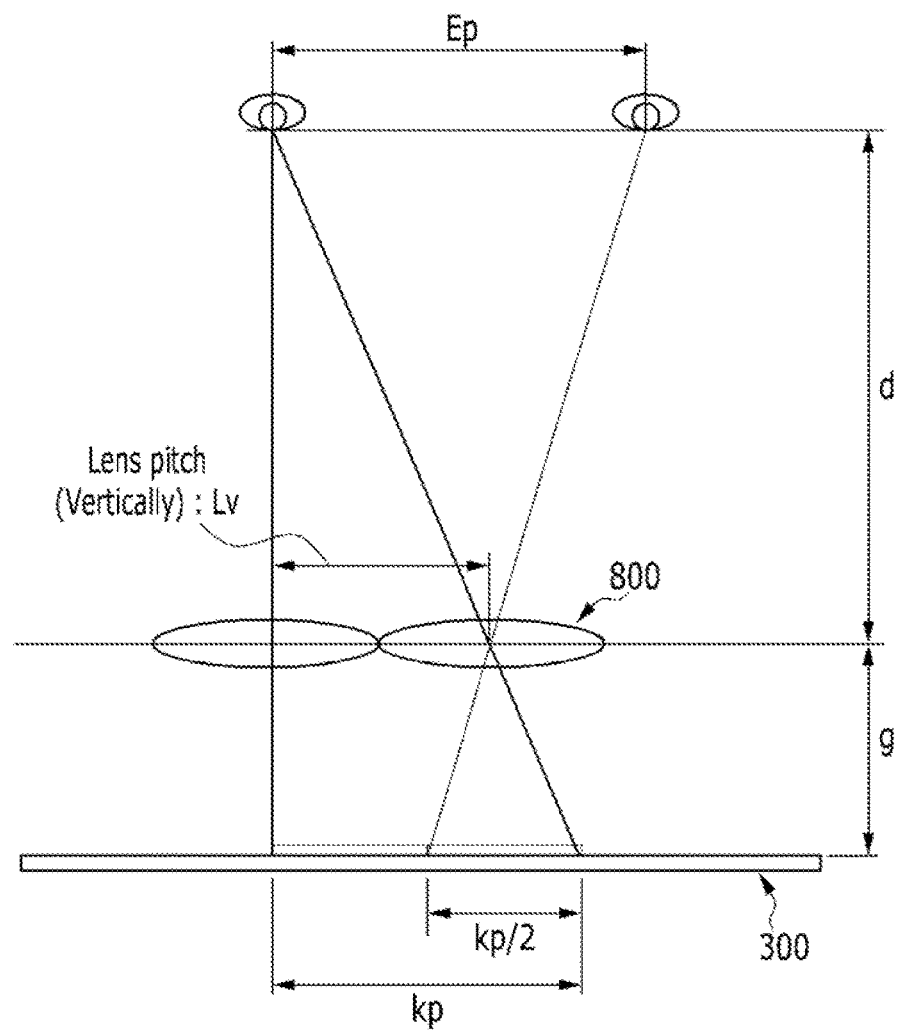
FIG. 18 illustrates a three-dimensional image display device using a calculated viewing distance in a portrait mode.

FIG. 18 illustrates a three-dimensional image display device using a calculated viewing distance in portrait mode. In an exemplary embodiment of FIG. 18, a calculation of the optimal viewing distance using Ep is illustrated.

Let d denote a distance between a viewer eye and the viewpoint divider, i.e., the optimal viewing distance, g denote a distance between the viewpoint divider 800 and the display panel 300, and kp denote a distance on the display panel 300 that corresponds to the pitch Lv of the lens 810 of the viewpoint dividing unit 800 in portrait mode; then the following Equations 14 and 15 may be satisfied.

$$Ep : d = \frac{kp}{2} : g \qquad \text{[Equation 14]}$$

$$Lv : d = kp : (d + g) \qquad \text{[Equation 15]}$$

FIG. 19A and FIG. 19B are tables showing various values of the three-dimensional image display device according to the designs of FIG. 15 to FIG. 18. FIG. 19A illustrates the case of landscape mode, and FIG. 19B illustrates the case of portrait mode.

OCA, Pol, and NA respectively denote Optically Clear Adhesive, Polarizer, and Numerical Aperture.

When 65.7 mm and 60.3 mm were respectively used in landscape mode and portrait mode, the optimal viewing distance and NA of the 10.1 inch display panel 300 were calculated as shown in FIG. 19A and FIG. 19B. In each mode, the optimal viewing distances become very similar by using different values as the viewing distance.

Figure 20:
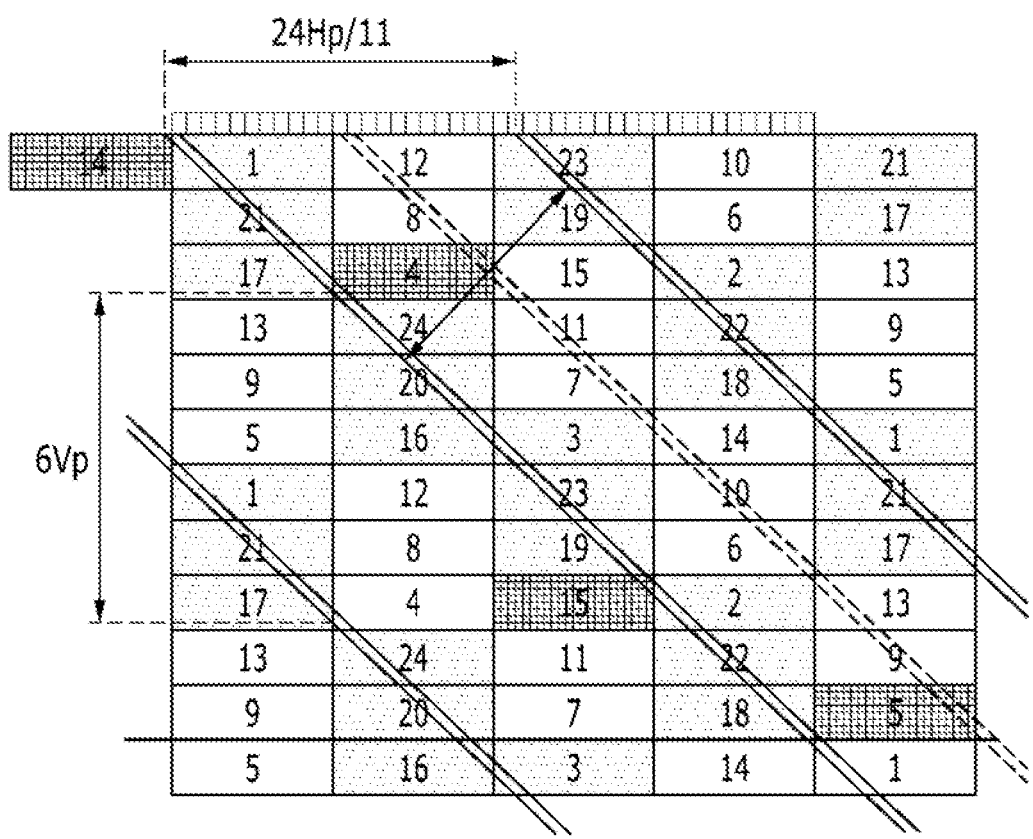
FIG. 20 illustrates a pixel design for configuring a lens pitch according to an exemplary embodiment of the present disclosure.

FIG. 20 illustrates a pixel design for configuring a lens pitch according to an exemplary embodiment of the present disclosure.

For the 10.1 inch display panel 300, as in an exemplary embodiment of FIG. 15, it is possible to manufacture the display panel 300 without any problem in NA by setting the pitch of the viewpoint dividing unit to be smaller than 2 Hp or 6 Vp. However, it may be seen from the tables of FIG. 19A and FIG. 19B that the optimal viewing distance increases as NA decreases. Accordingly, in an exemplary embodiment of FIG. 20, a design having a shorter optimal viewing distance will be described.

Two pixels are excluded from the pixels (the number n) of the PD in the exemplary embodiment of FIG. 20. That is, n=14−2=12.

The calculating methods for each value are the same as those in the exemplary embodiment of FIG. 15. The calculated results were as follows. kl and kp were respectively calculated as 24 Hp/11 and 6 Vp. That is, the lens pitch or the opening pitch of the viewpoint dividing unit has increased, while the crosstalk incidence rate was significantly reduced.

In this case, since the tilt angles are not switched, the defocus amounts were Hp/11 and Vp/4, Lh:Lv=12:11, El was 65.7 mm, and Ep was 60.3 mm. Accordingly, the design of the optimal viewing distance is basically the same as the cases of FIG. 15 to FIG. 18. The difference is that the number of pixel areas that display right eye and left eye images, which are concentrated on the optimal viewing distance plane, have increased from 10 to 12.

In this case, the magnitude of each pixel area, the control unit for head tracking, becomes 5.25 mm, an average of the landscape mode and the portrait mode, and thus the target determined from the third condition, which is 5 mm or more, is accomplished.

FIG. 21 is a table showing various values of the three-dimensional image display device according to the design of FIG. 20.

As compared with FIG. 19, the optimal viewing distance is decreased and the NA has increased in an exemplary embodiment of FIG. 20.

The accompanying drawings and the exemplary embodiments of the present disclosure are only examples of the present disclosure, and are used to describe the present disclosure but not to limit the scope of the present disclosure as defined by the following claims. Thus, it will be understood by those of ordinary skill in the art that various modifications and equivalent embodiments may be made. Therefore, the technical scope of the present disclosure may be defined by the technical idea of the following claims.

What is claimed is:

1. A three-dimensional image display device comprising:
a display panel that includes a plurality of pixels arranged in a matrix shape; and
a viewpoint divider that includes a plurality of viewpoint dividing units inclined at a tilt angle,
wherein Hp and Vp respectively denote a row-directional pitch and a column-directional pitch of the pixels, Hp>Vp, and the tilt angle A satisfies the following equation:

$$A = \tan^{-1} \frac{b * Hp}{(3b + c) * Vp},$$

wherein c is −1 or 1, and b is a natural number that is greater than 1, and
wherein Lh and Lv respectively denote a row-directional pitch and a column-directional pitch of the viewpoint dividing units along directions parallel to the pixel-row and pixel-column directions, respectively, and each pitch of the viewpoint dividing unit is configured to satisfy the following equation:

$$Lh{:}Lv = \frac{Hp}{3b+c} : \frac{Vp}{b}.$$

2. The three-dimensional image display device of claim 1, wherein an apparent row-directional width of each pixel as observed by a user through the viewpoint dividing units is $Hp/(3b+c)$, and
an apparent column-directional width of each pixel as observed by a user through the viewpoint dividing units is $Vp/b$.

3. The three-dimensional image display device of claim 1, wherein, El denotes a calculated viewing distance on a plane at an optimal viewing distance from the viewpoint dividing units of a landscape mode of the three-dimensional image display device that corresponds to Lh, Ep denotes a calculated viewing distance on a plane at an optimal viewing distance from the viewpoint dividing units of a portrait mode of the three-dimensional image display device that corresponds to Lv, and E denotes a human average viewing distance,
El satisfies the following equation:

$$El = \frac{Lh * E * 2}{Lh + Lv},$$

Ep satisfies the following equation:

$$Ep = \frac{Lv * E * 2}{Lh + Lv},$$

and
$E = \frac{1}{2}(El+Ep)$.

4. The three-dimensional image display device of claim 3, wherein, d denotes a distance between a viewer eye and the viewpoint divider, g denotes a distance between the viewpoint divider and the display panel, and kl denotes a distance on the display panel that corresponds to a pitch of the viewpoint dividing unit in a landscape mode,
the following equations are satisfied:

$$El{:}d = \frac{k1}{2}{:}g$$

and
$Lh{:}d = kl{:}(d+g)$.

5. The three-dimensional image display device of claim 3, wherein, d denotes a distance between a viewer eye and the viewpoint divider, g denotes a distance between the viewpoint divider and the display panel, and kp denotes a distance on the display panel corresponds to a pitch of the viewpoint dividing unit in a portrait mode,
the following equations are satisfied:

$$Ep{:}d = \frac{kp}{2}{:}g$$

and
$Lv{:}d = kp{:}(d+g)$.

6. The three-dimensional image display device of claim 4, wherein $n=4b+c-1$ denotes the number of pixels in a proximity dot,
kl satisfies the following equation:

$$k1 = \frac{2n * Hp}{3b + c},$$

and
kp satisfies the following equation:

$$kp = \frac{2n * Vp}{b}.$$

7. The three-dimensional image display device of claim 5, wherein $n=4b+c-1$ denotes the number of pixels in a proximity dot,
kl satisfies the following equation:

$$k1 = \frac{2n * Hp}{3b + c},$$

and
kp satisfies the following equation:

$$kp = \frac{2n * Vp}{b}.$$

8. The three-dimensional image display device of claim 1, the viewpoint dividing unit is a lenticular lens.

9. The three-dimensional image display device of claim 1, the viewpoint dividing unit is a parallax barrier.

10. A viewpoint divider for a three-dimensional image display device, comprising:
a plurality of lenticular lenses inclined at a tilt angle,
wherein Hp and Vp respectively denote a pixel row-directional pitch and a pixel column-directional pitch pixels, Hp>Vp, and the tilt angle A satisfies the following equation:

$$A = \tan^{-1}\frac{b * Hp}{(3b + c) * Vp},$$

where c is −1 or 1, and b is a natural number that is greater than 1, and
wherein Lh and Lv respectively denote a row-directional lens pitch and a column-directional lens pitch of the lenticular lens along directions parallel to the pixel-row and pixel-column directions, respectively, and each lens pitch of the lenticular lens is configured to satisfy the following equation:

$$Lh{:}Lv = \frac{Hp}{3b+c} : \frac{Vp}{b}.$$

11. The viewpoint divider of claim 10, wherein, El denotes a calculated viewing distance on a plane at an optimal viewing distance from the viewpoint divider of a landscape mode of a three-dimensional image display that includes said viewpoint divider and that corresponds to Lh, Ep denotes a calculated viewing distance on a plane at an optimal viewing distance from the viewpoint divider of a portrait mode of the three-dimensional image display device and that corresponds to Lv, and E denotes a human average viewing distance, El satisfies the following equation:

$$El = \frac{Lh * E * 2}{Lh + Lv},$$

Ep satisfies the following equation:

$$Ep = \frac{Lv * E * 2}{Lh + Lv}.$$

and
E=1/2(El+Ep).

12. The viewpoint divider of claim 11, wherein, d denotes a distance between a viewer eye and the viewpoint divider, g denotes a distance between the viewpoint divider and a display panel, and kl denotes a distance on the display panel that corresponds to a lens pitch of the viewpoint dividing unit in a landscape mode, the following equations are satisfied:

$$El:d = \frac{kl}{2}:g$$

and
Lh:d=kl:(d+g).

13. The viewpoint divider of claim 12, wherein n=4b+c−1 denotes the number of pixels in a proximity dot, kl satisfies the following equation:

$$kl = \frac{2n * Hp}{3b + c},$$

and kp satisfies the following equation:

$$kp = \frac{2n * Vp}{b}.$$

* * * * *